(12) United States Patent
Wood et al.

(10) Patent No.: US 10,374,747 B2
(45) Date of Patent: *Aug. 6, 2019

(54) POINT-TO-MULTIPOINT PATH COMPUTATION FOR WIDE AREA NETWORK OPTIMIZATION

(71) Applicant: Juniper Networks, Inc., Sunnyvale, CA (US)

(72) Inventors: David Wood, Woodbridge (GB); Ping Wang, Watchung, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,712

(22) Filed: Jul. 14, 2017

(65) Prior Publication Data

US 2017/0317780 A1 Nov. 2, 2017

Related U.S. Application Data

(63) Continuation of application No. 14/788,602, filed on Jun. 30, 2015, now Pat. No. 9,780,909, which is a
(Continued)

(51) Int. Cl.
*H04J 14/02* (2006.01)
*H04B 10/27* (2013.01)
*H04L 12/24* (2006.01)

(52) U.S. Cl.
CPC .......... *H04J 14/0286* (2013.01); *H04B 10/27* (2013.01); *H04J 14/0267* (2013.01);
(Continued)

(58) Field of Classification Search
CPC ............... H04J 14/0286; H04J 14/0267; H04J 2203/0055; H04J 2203/0098;
(Continued)

(56) References Cited

U.S. PATENT DOCUMENTS 6,778,531 B1  8/2004 Kodialam et al.
7,623,461 B2  11/2009 Vasseur et al.
(Continued)

FOREIGN PATENT DOCUMENTS

CN  101099351 A  1/2008
CN  103370908 A  10/2013
(Continued)

OTHER PUBLICATIONS

"Juniper Adva Packet Optical Convergence: Reducing Total Cost of Ownership in De-layered Networks," Juniper Networks, Inc., Whitepaper, Sep. 2014, 18 pp.
(Continued)

*Primary Examiner* — Walli Z Butt
(74) *Attorney, Agent, or Firm* — Shumaker & Sieffert, P.A.

(57) ABSTRACT

In some examples, a controller for a network includes a path computation module configured for execution by one or more processors to obtain configuration information for at least one point-to-multipoint label switched path (P2MP LSP); obtain, from the network via at least one protocol, network topology information defining a network topology for the network; determine, based on the network topology, a first solution comprising first respective paths through the network for the at least one P2MP LSP; determine, after generating a modified network topology based on the network topology, a second solution comprising second respective paths through the network for the at least one P2MP LSP. The controller also includes a path provisioning module configured for execution by the one or more processors to configure the network with the solution of the first solution and the second solution having the lowest total cost.

16 Claims, 8 Drawing Sheets

Related U.S. Application Data continuation-in-part of application No. 14/586,464, filed on Dec. 30, 2014, now Pat. No. 9,602,387, which is a continuation-in-part of application No. 14/585,170, filed on Dec. 29, 2014, now Pat. No. 9,712,447.

(52) U.S. Cl.
CPC .......... *H04L 41/0896* (2013.01); *H04L 41/12* (2013.01); *H04J 2203/0055* (2013.01); *H04J 2203/0098* (2013.01); *H04L 41/14* (2013.01)

(58) Field of Classification Search
CPC ..... H04L 41/0896; H04L 41/12; H04L 41/14; H04B 10/27
See application file for complete search history.

(56) References Cited

U.S. PATENT DOCUMENTS

| | | | |
|---|---|---|---|
| 7,715,369 | B1 | 5/2010 | Wang et al. |
| 8,693,374 | B1 | 4/2014 | Murphy et al. |
| 9,369,338 | B1 | 6/2016 | Krishnaswamy et al. |
| 9,450,817 | B1 | 9/2016 | Bahadur et al. |
| 9,602,387 | B2 | 3/2017 | Wood |
| 9,712,447 | B2 * | 7/2017 | Wood .................... H04L 47/125 |
| 9,780,909 | B2 | 10/2017 | Wood et al. |
| 9,794,165 | B1 | 10/2017 | Wood |
| 2004/0083277 | A1 | 4/2004 | Chaporkar et al. |
| 2011/0188852 | A1 | 8/2011 | Stodola et al. |
| 2012/0213224 | A1 * | 8/2012 | Chen ....................... H04L 45/04 370/390 |
| 2013/0252653 | A1 | 9/2013 | Aragon |
| 2014/0003229 | A1 | 1/2014 | Gandhi et al. |
| 2014/0099119 | A1 | 4/2014 | Wei et al. |
| 2014/0119181 | A1 * | 5/2014 | Jain ....................... H04L 45/125 370/235 |
| 2014/0204794 | A1 | 7/2014 | Ei-Najjar et al. |
| 2015/0003283 | A1 | 1/2015 | Previdi et al. |
| 2016/0087849 | A1 * | 3/2016 | Balasubramanian ... H04L 41/12 709/221 |

FOREIGN PATENT DOCUMENTS

| | | |
|---|---|---|
| CN | 103873366 A | 6/2014 |
| WO | 2008/011354 A2 | 1/2008 |
| WO | 2013091688 A1 | 6/2013 |
| WO | 2013184846 A1 | 12/2013 |

OTHER PUBLICATIONS

Andersson et al.. "LDP Specification," Network Working Group, RFC 3036, Standards Track, Jan. 2001, 133 pp.

Bousser et al., "Multilayer Design to Achieve Reliable and Resource Efficient Super-Core Networks," Abstract, WANDL Inc., MPLS Ethernet World Congress, Mar. 2013, 1 pp.

Din, "Genetic Algorithm for Finding Minimal Cost Light-forest of Multicast Routing on WDM Networks," Artificial Intelligence Review, vol. 29 No. 3-4, Nov. 1, 2009, pp. 195-222.

Donoso et al., "A Multi-Objective Optimization Scheme for Multicast Routing: A Multitree Approach," Telecommunications Systems, vol. 27 Issue 2-4, Oct. 2004, 23 pp.

Extended Search Report from counterpart European Application No. 15201555.8, dated Feb. 25, 2016, 10 pp.

Extended Search Report from counterpart European Application No. 15201579.8, dated Feb. 26, 2016, 10 pp.

Extended Search Report from counterpart European Application No. 15201589.7, dated Feb. 25, 2016, 10 pp.

Johnston et al., "A Robust Optimization Approach to Backup Network Design with Random Failures," IEEE/ACM Transactions on Networking, Aug. 2015, pp. 1216-1228.

Kodialam et al., "Dynamic Routing of Bandwidth Guaranteed Multicasts with Failure Backup," Proceedings of the 10th International Conference on Network Protocols (ICNP'02), Nov. 12-15, 2002, 10 pp.

Lee et al., "A Survey of Multipath Routing for Traffic Engineering," Information and Communications University (ICU), Jan. 2002, 27 pp.

Razo et al., "The PlaNet-PTN Module: A Single Layer Design Tool for Packet Transport Networks," Computer Aided Modeling and Design of Communication Links and Networks, Jun. 12, 2009, 5 pp.

Wood et al., "Multilayer IP-over-Transport Network Design," May 2012, 29 pp.

Prosecution History from U.S. Appl. No. 14/585,170, dated from Dec. 1, 2016 through Mar. 21, 2017, 51 pp.

Prosecution History from U.S. Appl. No. 14/586,464, dated from Jul. 12, 2016 through Feb. 23, 2017, 53 pp.

Prosecution History from U.S. Appl. No. 14/788,602, dated from Dec. 1, 2016 through Jun. 7, 2017, 74 pp.

Examination Report from counterpart European Application No. 15201579.8, dated Jan. 3, 2018, 9 pp.

Response to Communication pursuant to 69 EPC dated Jul. 11, 2016, from counterpart European Application No. 15201555.8, filed Jan. 3, 2017, 7 pp.

Response to Communication pursuant to 69 EPC dated Jul. 11, 2016, from counterpart European Application No. 15201579.8, filed Jan. 4, 2017, 7 pp.

Response to Communication pursuant to 69 EPC dated Jul. 11, 2016, from counterpart European Application No. 15201589.7, filed Jan. 4, 2017, 9 pp.

First Office Action and Search Report from counterpart Chinese Application No. 201511001308.9, dated Apr. 28, 2018, 8 pp.

Response to Examination Report dated Dec. 12, 2017, from counterpart European Application No. 15201555.8, filed Jun. 1, 2018, 12 pp.

Response to Examination Report dated Dec. 12, 2017, from counterpart European Application No. 15201589.7, filed Jun. 18, 2018, 13 pp.

Response to Extended Search Report dated Jan. 3, 2018, from counterpart European Application No. 15201579.8, filed Jul. 4, 2018, 14 pp.

Response to the Communication pursuant to Rule 69 EPC dated Jul. 11, 2016, from counterpart European Application No. 15201589.7, filed Jan. 4, 2017, 32 pp.

Datta et al., "Graph transformation approaches for diverse routing in shared risk resource group (SRRG) failures," Computer Networks, vol. 52, No. 12, Aug. 22, 2008, pp. 2381-2394.

"Shared Risk Resource Group," Wikipedia—The Free Encyclopedia, Nov. 28, 2014, retrieved from https://en.wikipedia.org/w/index.php?title=Shared_Risk_Resource_Group&oldid=635824332, retrieved on Nov. 17, 2017, 5 pp.

Examination Report from counterpart European Application No. 15201555.8, dated Dec. 1, 2017, 7 pp.

Examination Report from counterpart European Application No. 15201589.7, dated Dec. 6, 2017, 13 pp.

"Evolution strategy," Wikipedia the Online Encyclopedia, Version of Dec. 28, 2014, accessed on Apr. 18, 2019, accessed from https://en.wikipedia.org/w/index.php?title=Evolution_strategy&oldid=639946578, 4 pp.

"Differential evolution," Wikipedia the Online Encyclopedia, Version of Aug. 13, 2014, accessed on Apr. 18, 2019, accessed from https://en.wikipedia.org/w/index.php?title=Differential_evolution&oldid=621022974, 4 pp.

"Genetic algorithm," Wikipedia the Online Encyclopedia, Version of Dec. 9, 2014, accessed on Apr. 18, 2019, accessed from https://en.wikipedia.org/w/index.php?title=Genetic_algorithm&oldid=637291279, 16 pp.

"Simulated annealing," Wikipedia the Online Encyclopedia, Version of Dec. 11, 2014, accessed on Apr. 18, 2019, accessed from https://en.wikipedia.org/w/index.php?title=Simulated_annealing&oldid=637573563, 9 pp.

(56) References Cited

OTHER PUBLICATIONS

Haahr et al., "Heuristic Methods for Shared Backup Path Protection Planning," 4th International Workshop on Reliable Networks Design and Modeling, co-located with ICUMT 2012 Conference, IEEE, Oct. 3, 2012, 7 pp.

Shah et al., "Differentiated reliability in optical networks: Theoretical and practical results," Journal of Lightwave Technology, vol. 21, Issue 11, IEEE, Nov. 1, 2003, 11 pp.

Examination Report from counterpart European Application No. 15201555.8, dated Mar. 21, 2019, 14 pp.

\* cited by examiner

POINT-TO-MULTIPOINT PATH COMPUTATION FOR WIDE AREA NETWORK OPTIMIZATION

This application is a continuation of U.S. patent application Ser. No. 14/788,602, filed Jun. 30, 2015, which is a continuation-in-part of application Ser. No. 14/586,464, filed Dec. 30, 2014, which is a continuation-in-part of application Ser. No. 14/585,170, filed Dec. 29, 2014, each of which is incorporated herein by reference in its entirety.

TECHNICAL FIELD

The invention relates to computer networks and, more specifically, to path computation of computer network paths.

BACKGROUND

Routing devices within a network, often referred to as routers, maintain tables of routing information that describe available routes through the network. Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. Using MPLS, a source device can request a path through a network, i.e., a Label Switched Path (LSP). An LSP defines a distinct path through the network to carry packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

Traffic engineering may be applied within a network for a variety of purposes, such as to route traffic around network failures or congested links or to direct certain traffic along a particular path through the network that meets a set of explicit requirements. Historically, MPLS label distribution was driven by protocols such as label distribution protocol (LDP), Resource Reservation Protocol with Traffic Engineering extensions (RSVP-TE) and labeled Border Gateway Protocol (LBGP). Procedures for LDP by which label switching routers (LSRs) distribute labels to support MPLS forwarding along normally routed paths are described in L. Anderson, "LDP Specification," RFC 3036, Internet Engineering Task Force (IETF), January 2001, the entire contents of which are incorporated by reference herein. RSVP-TE uses constraint information, such as bandwidth availability, to compute and establish LSPs within a resource-constrained network. RSVP-TE may use bandwidth availability information accumulated by a link-state interior routing protocol, such as the Intermediate System-Intermediate System (IS-IS) protocol or the Open Shortest Path First (OSPF) protocol, extended to carry traffic engineering information.

Head-end routers of an LSP are commonly known as ingress routers, while routers at the tail-end of the LSP are commonly known as egress routers. Ingress and egress routers, as well as intermediate routers along the LSP that support MPLS, are referred to generically as label switching routers (LSRs). A set of packets to be forwarded along the LSP is referred to as a forwarding equivalence class (FEC). A plurality of FECs may exist for each LSP, but there may be only one active LSP for any given FEC. A FEC definition typically includes the IP address of the destination of the packets traversing the LSP, e.g., an IP address to which the packets are destined. The ingress label edge router (LER) uses routing information, propagated upward along the LSP from the egress LER, to determine the LSP and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The egress LER removes the label from the packet and forwards the packet to its destination in accordance with non-label based packet forwarding techniques.

In general, each router along the LSP maintains a label mapping that associates a FEC with an incoming label and an outgoing label. In this manner, when an LSR receives a labeled packet, the LSR may swap the label (i.e., the incoming label) on the packet with the outgoing label by performing a lookup in the context. The LSR may then forward the packet to the next LSR or LER along the LSP. The next router along the LSP from a given router is commonly referred to as a downstream router or a next hop.

In other words, once a packet is mapped on to an LSP by an LER, the LSRs along the LSP forward the packet based on labels attached to the packet rather than making independent forwarding decisions based on the packet destination and the LSRs' routing information. A Traffic Engineering MPLS LSP (TE LSP) may in this way be used to define and implement a path from a source device to a destination device that satisfies requirements for certain traffic transported by the network.

Networks that implement multicasting, or "multicast networks," use network resources such as routers and links differently than ordinary point-to-point flows or LSPs. Such networks may establish point-to-multipoint (P2MP) LSPs to multicast packets from a single source to multiple destinations. Using a P2MP LSP, routers of the network that are nodes of the P2MP LSP may send a single copy of a packet mapped to the P2MP LSP downstream on a given branch of the P2MP LSP. Downstream routers of the P2MP LSP to replicate the packet as needed in order to reach the downstream destinations. In this way, if the network is configured to multicast (alternatively, "broadcast") the same data from a source to multiple destinations, the traffic need be counted only once on each branch of the tree, regardless of the number of source to destination paths rely upon the links of the branch for transporting the traffic. The network resources are used more efficiently (i.e., optimized) if the paths to different destinations for the same P2MP multicast tree use as many as possible common elements on the paths.

SUMMARY

In general, techniques are described for determining point-to-multipoint (P2MP) label switched paths (LSPs) in a network. For example, a controller for a network obtains topology information describing the network topology and determines a solution of paths for a set of multiple P2MP LSPs from at least one source to a set of destinations through the network using a network topology model based on the topology information. The controller then determines a total resource cost to the network for the solution before modifying the network topology model by either (1) blocking a link in the network topology by, e.g., applying a high link penalty to the link metric in the model or (2) unblocking a link in the network topology that had been previously blocked. The "total resource cost" represents an overall "cost" value calculated for the paths determined for the P2MP LSPs based on the overall cost of the network resources used and, in some cases, the proportion of these resources used by the P2MP LSPs.

The controller iterates the above operations while storing data defining the best (e.g., lowest-cost) solution determined for all of the previous iterations. In some examples, the controller applies link penalties to link metrics and to solutions according to penalty criteria to facilitate path diversity, the avoidance of routing loops, and/or the satisfaction of LSP constraints, for instance. These penalty costs are added to the "total resource cost" value of the P2MP LSP set to arrive at a total cost for the solution. Blocking a link in the network topology may include applying a high penalty to the link metric (in one or both directions) that is used by a shortest-path (or shortest-diverse-path) algorithm to determine the paths of the individual P2MP LSPs. The controller determines the P2MP LSP paths based on the link metrics (plus any metric penalties added by blocking the link in one or both directions) and determines the "total resource cost" of the P2MP LSP set based on the network resources used. The controller may then incorporate applied penalties into a total cost for a solution as part of an iteration that determines the solution, the total cost including both the total resource cost to the network and any applied penalties for the solution. This pattern of link blocking and unblocking in effect determines the paths of the P2MP LSP set and hence determines the total resource cost and total penalty cost of the solutions.

As part of an iteration, the controller may determine whether the solution determined for the iteration has a lower total cost than the previous solution. The controller may attempt to avoid local minima to the total cost of solutions gradient by applying simulated annealing to determine whether to accept a solution (including the modified network topology) as the basis for subsequent modifications to the network topology or to instead revert to a solution for a previous iteration as the basis. In some examples, if the total cost for the solution is less than that for the previous solution, then the controller accepts the solution. If however the total cost for the solution is greater than that for the previous solution, then controller may still accept the solution dependent on a dynamic probability that is commensurate with the magnitude of the total cost differential and/or the iteration progress. For example, the controller may be less likely to accept a worse (i.e., greater total cost) solution the fewer the number of iterations there are remaining to be performed.

The controller may iterate according to the above for a fixed number of iterations or until set of acceptance criteria is reached, while storing data defining the best solution determined for all of the previous iterations. At the completion of the fixed number of iterations, the controller may configure the network with the path for the P2MP LSP. In some examples, the controller may attempt to identify multiple diverse paths for a P2MP LSP set (or two P2MP LSP sets from different sources) to facilitate redundancy for the P2MP LSP set.

The techniques may provide one or more advantages. For example, a controller that applies the above-described techniques may facilitate, with each iteration, movement toward global optimization along the total cost of solutions gradient for an P2MP LSP path with respect to a total cost that accounts for routing loops, the possibility of correctly computing paths that satisfy physical-diversity, failure resilience, and/or the satisfaction of LSP constraints. While the globally-optimal solution may not be reached in all cases, the techniques may avoid at least some local minima on the total cost of solutions gradient, which may result in robust yet lower resource cost solutions.

In one example, a method comprises obtaining, by a controller of a network, configuration information for at least one point-to-multipoint label switched path (P2MP LSP). The method also comprises obtaining, by the controller from the network via at least one protocol, network topology information defining a network topology for the network. The method further comprises determining, by the controller based on the network topology, a first solution comprising first respective paths through the network for the at least one P2MP LSP. The method also comprises determining, by the controller after generating a modified network topology based on the network topology, a second solution comprising second respective paths through the network for the at least one P2MP LSP. The method further comprises configuring, by the controller, the network with the solution of the first solution and the second solution having a lowest total cost, the lowest total cost of the solution including a total resource cost to the network for the solution.

In another example, a controller for a network comprises one or more processors coupled to a memory and a path computation module configured for execution by the one or more processors to obtain configuration information for at least one point-to-multipoint label switched path (P2MP LSP); obtain, from the network via at least one protocol, network topology information defining a network topology for the network; determine, based on the network topology, a first solution comprising first respective paths through the network for the at least one P2MP LSP; determine, after generating a modified network topology based on the network topology, a second solution comprising second respective paths through the network for the at least one P2MP LSP. The controller also includes a path provisioning module configured for execution by the one or more processors to configure the network with the solution of the first solution and the second solution having a lowest total cost, the lowest total cost of the solution including a total resource cost to the network for the solution.

In another example, a non-transitory computer-readable medium contains instructions for causing one or more programmable processors of a controller of a network to obtain configuration information for at least one point-to-multipoint label switched path (P2MP LSP); obtain, from the network via at least one protocol, network topology information defining a network topology for the network;

determine, based on the network topology, a first solution comprising first respective paths through the network for the at least one P2MP LSP; determine, after generating a modified network topology based on the network topology, a second solution comprising second respective paths through the network for the at least one P2MP LSP; and configure the network with the solution of the first solution and the second solution having a lowest total cost, the lowest total cost of the solution including a total resource cost to the network for the solution.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
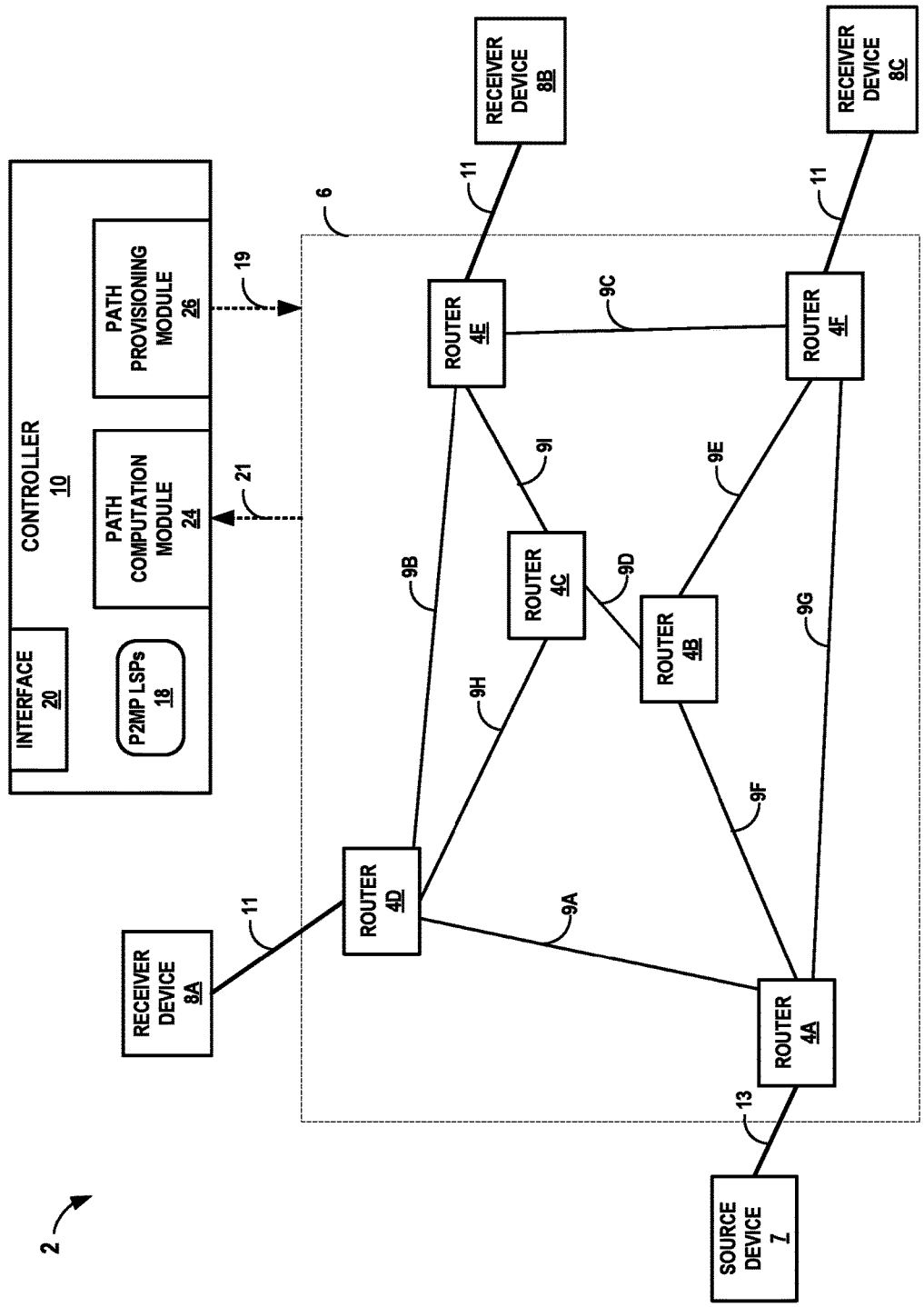
FIG. 1 is a block diagram illustrating a network system in which a path computation device is configured to compute paths for point-to-multipoint label switched paths (LSPs) in accordance with techniques of this disclosure.

FIG. 1 is a block diagram illustrating a network system in which a path computation device is configured to compute paths for point-to-multipoint label switched paths (LSPs) in accordance with techniques of this disclosure. In this example, network system 2 includes controller 10 and a Multi-Protocol Label Switching (MPLS) network 6 ("network 6") having a plurality of routers 4A-4F ("routers 4") interconnected in the illustrated topology by network links (not shown). Network 6 may represent a wide area network (WAN). Each pair of connected routers 4 may be connected by one or more network links 9, with each illustrated network link 9A-9I representing a logical or physical link having an associated total bandwidth. Other examples of network 6 may include routers 4 arranged in varied topologies according to a set of network links 9. Physical links of network 6 may include, for example, Ethernet PHY, Synchronous Optical Networking (SONET)/Synchronous Digital Hierarchy (SDH), Lambda, or other Layer 2 data links that include packet transport capability. Logical links of network 6 may include, for example, an Ethernet Virtual local area network (VLAN), a Multi-Protocol Label Switching (MPLS) Label Switched Path (LSP), or an MPLS traffic-engineered (TE) LSP. Various examples of network 6 may encompass many hundreds or even thousands of routers. Furthermore, although primarily described herein as routers, routers 4 may represent other types of forwarding devices, such as L2 switches, L3 switches, and L2/ L3 switches, repeaters, optical cross-connects (OXCs), optical add-drop multiplexers (OADMs), multiplexing device, or other types of devices, within network 6 that forward network traffic, including optical data. For example, routers 4 may be layer three (L3) routers optically connected by intermediate OXCs, such as OXCs to which the routers 4 have access links. Accordingly, the techniques described in this disclosure may be applicable not only to packet/label switched flows but also to other flow types with different types of interface switching, such as Lambda-based, wavelength-division multiplexing (WDM)/dense WDM (DWDM), and time-division multiplexing (TDM)-based.

Routers 4 are members of a path computation domain served by controller 10. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. Network links connecting routers 4 may thus be interior links, inter-AS transport links, another type of network link, or some combination thereof. While illustrated and described with respect to routers, the techniques may be applicable to any network device that implements Multi-Protocol Label Switching (MPLS) or Generalized MPLS (GMPLS), for instance.

Controller 10 is a path computation device that uses traffic engineering information 21 learned from routers 4 of network 6 to determine paths for and configure multiple point-to-multipoint (P2MP) label switched paths (LSPs) for P2MP LSPs 18 in a network. In other words, there may be multiple sets of potentially diverse P2MP trees over the same network 6, each set of P2MP trees carrying different broadcast channels and between different sets of sources and destinations. As described in further detail herein, controller 10 may configure paths for P2MP LSPs 18 in the network when P2MP LSPs 18 is defined and added to the network or modified (e.g., upon changing the traffic bandwidth or the list of destinations for any of P2MP LSPs 18). Controller 10 may also, or alternatively, dynamically re-compute updated paths for P2MP LSPs 18 and configure the updated paths in the network when the topology of network 6 changes, including changes to the network topology of network 6 by adding or removing links or nodes, changes to the physical paths of the links 9, and/or the failure of one or more of links 9 and routers 4.

As used herein, a set of P2MP LSPs may be defined alternatively as: (1) individual isolated groups of LSPs broadcasting the same traffic to a set of destinations; (2) individual isolated groups of LSPs broadcasting the same traffic from the same source to a set of destinations on two diverse paths, where the two diverse paths from the source to each destination are diverse (or as diverse as possible given the network topology); or (3) individual isolated groups of LSPs broadcasting the same traffic from two different sources to a set of destinations on two diverse paths, where the two paths from the different sources to the same destination must be diverse or as diverse as possible given the network topology.

The terms "path" and "P2MP path" used herein with respect to P2MP LSPs, refers to a point-to-multipoint (P2MP) path proceeding from a source to multiple destinations. A multicast distribution tree for a P2MP LSP may be set on a path computed for the P2MP LSP. In some examples and for a P2MP LSP, controller 10 attempts to determine diverse P2MP paths from the source to the multiple destinations. Two paths are "diverse" if the two paths do not share any common physical or user-defined class of resources (except where necessary given the network topology). For example, a user may specify that the two paths must not share any or all of the following elements: the same nodes; the same links or links having entries in common from the same shared-risk group (of links and/or nodes). Path diversity may include node diversity, link diversity, and shared-risk diversity, where node diversity refers to paths that do not share any nodes, link diversity refers to paths that do not share any links, and shared-risk diversity refers to paths that do not have any shared risks. For a source, S, to a set of destinations {D1, D2, Dn}, two P2MP paths are diverse if each of the path pairs for all D are diverse. Or more formally, given source S to set of destinations $\{D1_x, \ldots, Di_x|i>0\}$ for a first P2MP path and to set of destinations $\{D1_y, \ldots, Di_y|i>1\}$ for a second P2MP path, the path pair $\{S \rightarrow Dz_x, S \rightarrow Dz_y\}$ must be diverse for all z. Sets of destinations $\{D1_x, \ldots, Di_x|i>0\}$ and $\{D1_y, \ldots, Di_y|i>1\}$ may be identical. In some examples, controller 10 may relax the strict diversity requirement such that a set of P2MP paths may be considered diverse so long as the P2MP paths do not share a configurable number of links, nodes, and/or shared risks, for instance.

Controller 10 may represent a high-level controller for configuring and managing network 6. Controller 10 may represent one or more general-purpose servers; an appliance, controller, or other special-purpose device for computing paths; an application executed by a computing device; a distributed control plane of routers 4 that computes paths for LSPs managed by the routers; and so forth. In some cases, aspects of controller 10 may be distributed among one or more real or virtual computing devices. Any such devices listed above may be in-network or out-of-network with regard to network 6. Example details of a software-defined networking (SDN) controller for a software-defined network, which may perform operations described herein to compute paths and route LSPs, are described in PCT International Patent Application PCT/US2013/044378, filed Jun. 5, 2013, and entitled, "PHYSICAL PATH DETERMINATION FOR VIRTUAL NETWORK PACKET FLOWS," which is incorporated by reference herein in its entirety. Additional examples details of an SDN controller for a software-defined network to obtain topology information for and to provision a network are described in U.S. patent application Ser. No. 14/042,614, filed Sep. 30, 2013, and entitled "SOFTWARE DEFINED NETWORK CONTROLLER," and U.S. patent application Ser. No. 14/500,736, filed Sep. 29, 2014, and entitled "BATCHED PATH COMPUTATION IN RESOURCE-CONSTRAINED NETWORKS," which are both incorporated by reference herein in their entireties.

Point-to-multipoint label-switched paths 18 ("P2MP LSPs 18" or more simply, "LSPs 18") represents a data structure, such as an LSP database, that stores definitions for P2MP LSPs to be installed to network 6. Each LSP definition in LSPs 18 defines a P2MP LSP according to source and destination routers of routers 4, as well as a required bandwidth for the LSP that defines one constraint on the LSP. In some examples, LSP definitions may include a defined route or path for the corresponding LSP at least in part, required or excluded link attributes, or other constraints for the corresponding LSP that may affect computation of a path for the corresponding LSP. LSPs 18 includes a P2MP LSP definition that specifies, in this example, router 4A coupled to source device 8 as the source; routers 4D, 4E, and 4F as the destinations; and may specify a required bandwidth, B, for the P2MP LSP. An administrator may set a static bandwidth for an LSP definition by configuration, or the bandwidth may be dynamic according to auto-bandwidth features of routers 4. Routers 4A, 4D, 4E, and 4F may be provider edge (PE) routers in that the PE routers operate and the edge of network 6 to provide services to client networks of clients of a service provider that operates network 6, while routers 4B, 4C may be provider (P) or "core" routers.

Controller 10 presents northbound interface 20 that may be invoked by other controllers in a hierarchical arrangement of controllers or by an orchestrator, administrator, application, or other entity, to request service paths that resolve to an LSP definition stored to LSPs 18 and configured in part in network 6. Interface 20 may be usable for integration with an orchestration system such as OpenStack; interface 20 may also or alternatively usable by other applications or the operator's Operations Support Systems (OSS)/Business Support Systems (BSS). Interface 20 may in some cases present a RESTful Application Programming Interface (API).

To obtain traffic engineering information 21, controller 10 may execute one or more network routing protocols, extended to carry traffic engineering information, to listen for routing protocol advertisements that carry such traffic engineering information. Traffic engineering information may include node and interface identifiers for routers 4; administrative weights and available bandwidth per priority level for links; LSP identifier and state information for virtual links, and other information for computing paths for traffic engineered LSPs. Controller 10 may store traffic engineering information to a traffic engineering database (TED).

Example applications may include digital video or other media distribution that may use P2MP LSPs in network 6 to transport packets that include movie, television, radio, and/or other content. Source device 7 coupled by access link 13 to router 4A may represent a content originator, source, and/or distributor that sends packetized content to e.g., remote studios, headends, and/or transmission towers, represented by destination devices 8A-8C and coupled to respective routers 4D, 4E, 4F by access links 11. Other applications that use P2MP LSPs provided by network 6 may include Voice-over-IP conference telephony, Video-on-Demand (VoD), and other multicast applications.

In accordance with techniques described herein, example controller 10 includes a path computation module 24 configured to compute, using learned traffic engineering information 21, a path for a P2MP LSP of LSPs 18 from a source represented by router 4A to destinations represented by routers 4D, 4E, 4F. Resulting P2MP paths may be confined to a single domain or may cross several domains.

To compute the path for the P2MP LSP, path computation module 24 of controller 10 iteratively determines solutions for the path to globally-optimize a total cost that accounts for routing loops, the possibility of diversity, failure resilience, and/or the satisfaction of LSP constraints on the P2MP LSP. For each iteration, path computation module 24 determines a solution for a plurality of paths for the P2MP LSP from at least one source to a set of destinations through the network. The path computation module 24 may apply a suitable point-to-multipoint or minimum spanning tree algorithm to the network topology that is a representation of elements of network 6 in order to determine the plurality of paths for the P2MP LSP for a given solution. For example, path computation module 24 may apply Kruskal's algorithm, Prim's algorithm, or a modified version thereof to the modified network topology model to determine paths for the P2MP LSP for each iteration.

As part of the iteration, path computation module 24 determines a total cost to the network for the solution and determines whether the determined paths satisfy the constraints on the P2MP LSP. Path computation module 24 then modifies the network topology model by either (1) blocking a link in the network topology, such as by adding a high penalty to the link metric in one or both directions to affect the shortest-path (or shortest-diverse-path) algorithm; or (2) unblocking a link in the network topology that had been previously blocked, such as by removing a previously-applied high penalty to the link metric in one or both directions. The P2MP or minimum spanning tree algorithm may determine paths for one or more LSPs based on the link metrics of links in the network topology model. Distorting the network topology in this way results in a modified network topology model that path computation module 24 may (or may not) use as the basis for a subsequent iteration. Path computation module 24 iterates the above operations while storing data defining the best (e.g., lowest-cost) solution determined for all of the previous iterations. Here the "links" in the network can comprise merely those links that actually exist in the current network topology or, in some cases, can include additional "candidate" links usable by the controller 10 if needed to route the P2MP LSPs or if such candidate link would otherwise result in a lower network cost if used.

In general and as noted above, links in the network topology model that are available for use by controller 11 in formulating a solution can either be limited to the links that already exist in the network topology (which may or may not be used by the P2MP LSPs). However, in some instances, controller 11 can add to the network topology model other links, which can be used by the design and are referred to herein as "candidate links." As part of path optimization, the controller 11 may determine to use at least some of these candidate links to carry the P2MP LSPs 18. As part of its design output, the controller 10 may signal to the network (or the network operator) the information required to configure and activate these determined candidate links.

In some examples, the controller 11 obtains data from the network transport layer about the routes that will be used to carry the network links on the physical topology. Alternatively, the controller 11 may obtain abstract link data describing just the shared-risks encountered by these links on their physical paths, as well as information relevant to path optimization such as on the physical length or delay of the link. This information may be used by controller 11 to determine diverse paths for the P2MP LSPs in order that the paths do not share any shared-risk components (e.g., physical link sections). Information regarding the transport network routes or the abstract link data defining just the shared risk information can apply both to the existing links 9 in the current network topology and to additional candidate links that are available (but not currently configured in the network) to transport traffic. The controller 11 may obtain this abstract link data or transport network routes from a third-party network management system for the transport layer underlying the network topology or by compiling the abstract link data based on available data. In either case, the abstract link data "abstracts" the underlying transport layer to enable the controller 11 to compute routes through the transport layer using the abstract link data.

As part of an iteration, the path computation module 24 may determine whether the solution determined for the iteration has a lower total cost than the previous solution. The path computation module 24 may attempt to avoid local minima to the total cost of solutions gradient by applying simulated annealing to determine whether to accept a solution (including the modified network topology) as the basis for subsequent modifications to the network topology or to instead revert to a solution for a previous iteration as the basis. In some examples, if the total cost for the solution is less than that for the previous solution, then the controller accepts the solution. If however the total cost for the solution is greater than that for the previous solution, then controller may still accept the solution dependent on a dynamic probability that is commensurate with the magnitude of the total cost differential and/or the iteration progress. For example, the path computation module 24 may be less likely to accept a worse (i.e., greater total cost) solution the fewer the number of iterations there are remaining to be performed.

Path computation module 24 may iterate according to the above for, e.g., a fixed number of iterations, a fixed elapsed time, until the P2MP LSP paths are diverse, until the total resource costs are less than some acceptable value, until there are no routing loops, some combination of the above, or according to some other acceptance criteria. Path computation module 24 iterates while storing data defining the best solution determined for all of the previous iterations. Upon determining an acceptable solution, path provisioning module 26 of controller 10 configures network 6 to implement, for the P2MP LSP, the paths that constitute the lowest total cost solution determined by path computation module 24. In some examples, path provisioning module 26 installs the routed P2MP LSP by sending path descriptors 19 to network 6, which configures the P2MP LSP according to the path descriptors 19. A path descriptor may include an Explicit Route Object (ERO) for the P2MP LSP or other configuration information and may include information describing the corresponding path including path type (primary or detour); bandwidth for each Class of Service (CoS) value; and/or, for each node in the ordered P2MP path from ingress router 4A to egress routers 4D, 4E, and 4F, a node identifier, ingress label, and egress label.

The techniques of this disclosure may provide one or more advantages. For example, controller 10 may facilitate, with each iteration, movement toward global optimization along the total cost of solutions gradient for the P2MP LSP path with respect to a total cost that accounts for routing loops, the possibility of diversity, failure resilience, and/or the satisfaction of LSP constraints. While controller 10 may be unable to identify a globally-optimal solution in all cases, the controller 10 may yet avoid at least some local minima on the total cost of solutions gradient, which may result in robust yet lower resource cost solutions.

Figure 2A:
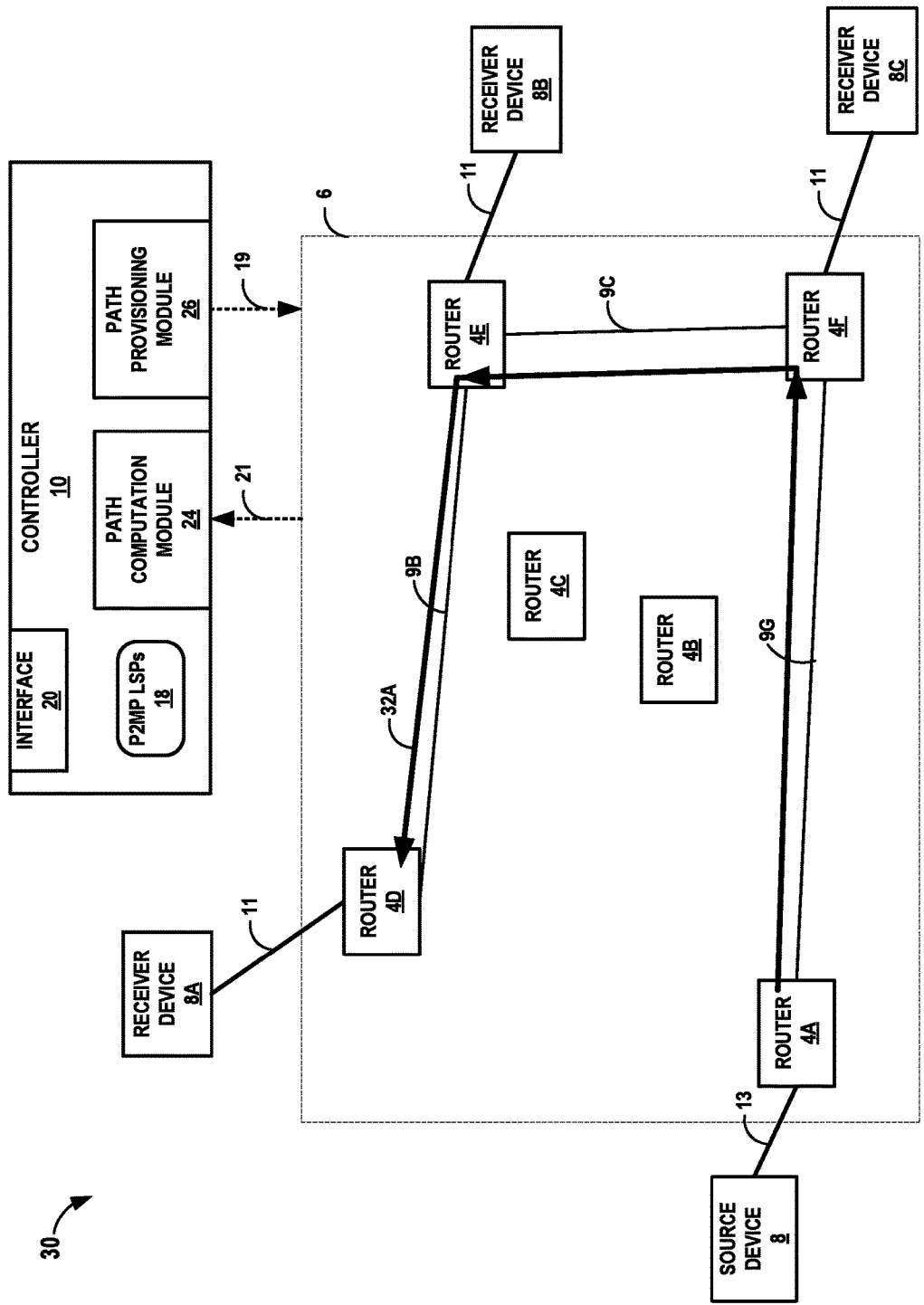
FIGS. 2A-2B are block diagrams depicting diverse P2MP paths for a point-to-multipoint label switched path determined by a controller and provisioned in a network according to techniques described herein.
Figure 2B:
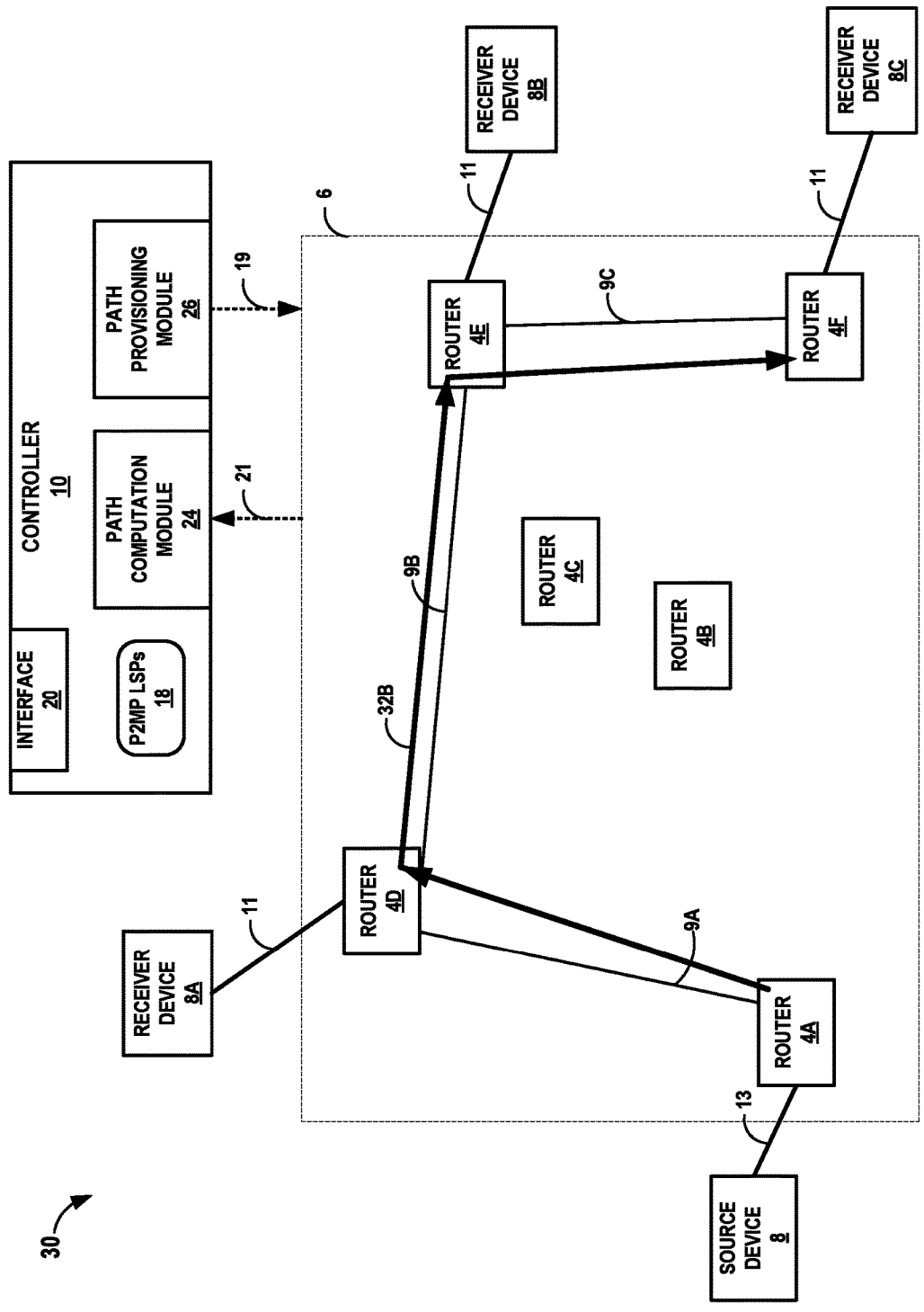

FIGS. 2A-2B are block diagrams depicting diverse P2MP paths for a point-to-multipoint label switched path determined by a controller and provisioned in a network according to techniques described herein. In this example, path computation module 24 of controller 10 iteratively determines shortest diverse paths for a P2MP LSP of LSPs 18 by progressively pruning links 9 of network 6 to generate modified topologies that, for each iteration, result in different determined shortest diverse paths having different total costs. FIGS. 2A-2B depict network 6 pruned of links 9 merely to illustrate the modified network topology with which path computation module 24 determined a solution.

A given link 9 may constitute part of different P2MP paths for the same multicast traffic source in both directions on the link. For example, some examples of network 6 or determined P2MP paths may have a ring topology, with one path proceeding in one direction around the ring topology and another path proceeding in the other direction. Accordingly, in determining a solution for diverse paths for a P2MP LSP, path computation module 24 may block or unblock each direction of each of links 9 independently from carrying either the primary or the alternative path for the P2MP LSP.

As illustrated in FIGS. 2A-2B, path computation module 24 applies diverse P2MP path determination techniques described herein to iteratively prune the network topology of network 6 of both directions of links 9D, 9E, 9F, 9H, and 9I. In determining P2MP LSP 32A and 32B, path computation module 24 additionally prunes (i.e., blocks by adding a high penalty to the shortest-path metric to) link 9A from router 4A to router 4D and link 9G from router 4A to router 4F. Links 9B and 9C may (or may not be) blocked in either direction in order to arrive at the solution depicted in FIGS. 2A-2B by P2MP LSPs 32A-32B. In some examples, path computation module 24 may use, for each of links 9, a block flag for each of a pair of diverse P2MP paths. In other words, each of links 9 may be configured to allow one P2MP path in the diverse P2MP paths but disallow the shortest-path algorithm from using the link for the diverse part of the P2MP tree.

Figure 3:
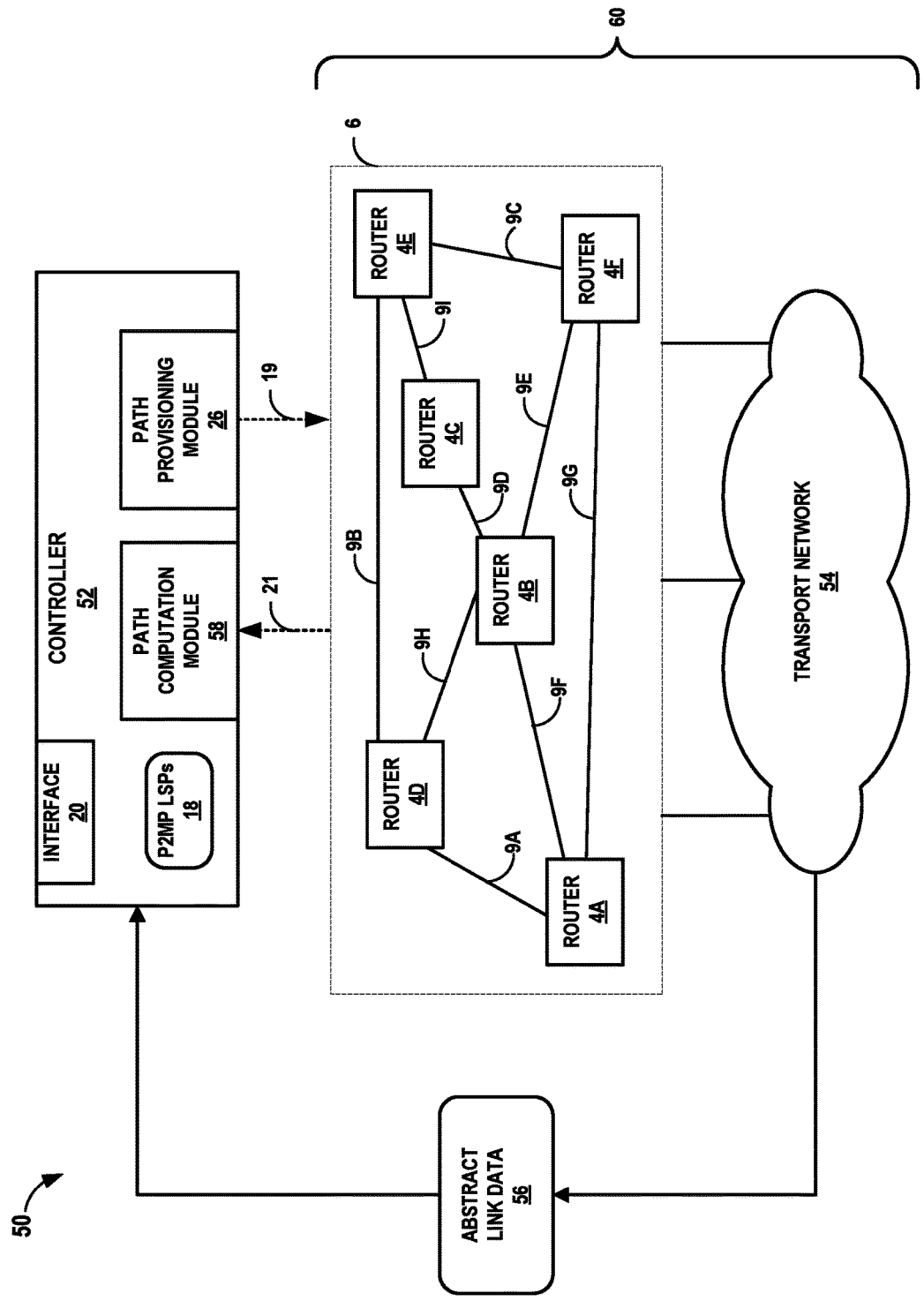
FIG. 3 is a block diagram illustrating an example network system in which a controller obtains abstract link data for a multi-layer network and uses the abstract link data to determine paths for a point-to-multipoint label switched path, in accordance with techniques described in this disclosure.

FIG. 3 is a block diagram illustrating an example network system in which a controller obtains abstract link data for a multi-layer network and uses the abstract link data to determine paths for a point-to-multipoint label switched path, in accordance with techniques described in this disclosure. Controller 52 and path computation module 58 may represent example instances of controller 10 and path computation module 24 of FIGS. 1, 2A-2B, respectively.

In this example, multi-layer network 60 includes network 6 and transport network 54. Transport network 54 represents an optical transport network (OTN) or other transport network underlying network 6, which includes routers 4 to control switching and routing of packet flows. As noted above with respect to FIG. 1, examples of routers 4 include layer 3 (L3) routers and layer 2 (L2) switches or L2/L3 switches that collectively provide network 6. That is, network 6 typically provides L2/L3 traffic forwarding services, such as traffic engineering via Multiprotocol Label Switching traffic-engineered (MPLS-TE) label switched paths (LSP) including P2MP LSPs, Virtual Local Area Network (VLANs), and so forth.

Underlying transport network 54 transports, multiplexes, and switches packet-based communications through high-speed optical fiber links. Transport network 54 may include multiple optical communication devices (e.g., packet-optical transport devices) interconnected via optical links and controlling transmission of optical signals carrying packet data along the optical links. In this way, optical transport system 60 provides a physical layer that physically interconnects routers 4 of network 6.

Although not shown in FIG. 3 for simplicity, packet-optical transport devices may be, for example, ROADMs, PCXs, DWDMs or other devices that transmit, switch and/or multiplex optical signals. Transport network 54 typically includes a number of other components, such as amplifiers, transponders, OTTs, repeaters and other equipment for controlling transmission of optical packet data along optical links (also not shown). Large optical transport systems may have significant numbers of such devices that influence optical transmissions. Although described with respect to only optical links, transport system 54 may include other types of physical links as well, such as Ethernet PHY, Synchronous Optical Networking (SONET)/Synchronous Digital Hierarchy (SDH), Lambda, or other Layer 2 data links that include packet transport capability.

In some example implementations, controller 52 provides integrated control over both routers 4 and packet-optical transport devices underlying transport network 54 with respect to transport of packet data through the optical links and other equipment. For example, controller 52 may not only control path selection and traffic engineering operations of network 6 but may also provide integrated control over allocation or utilization of the optical spectrum and wavelengths utilized by each packet-optical transport device within transport network 54 that underlies the elements of network 6, or controller 52 may use the path or abstract link information from the transport layer to determine diverse paths for the P2MP LSPs if required.

Path computation module 58 obtains abstract link data 56 that describes links 9 of network 6. More specifically, abstract link data 56 represents data "leaked" in some manner from the transport network 54 to controller 52 to enable the application of further constraints by path computation module 58 to the determination of paths or diverse-paths for P2MP LSPs. Such constraints may correspond to the types of abstract link data 56, which may include available ("candidate") links in addition to links 9, link lengths, link metrics (which may be based on link lengths), link costs (which may also be based on link lengths), and a list of Shared Risk Link Groups (SRLGs) for links.

Path computation module 58 may obtain abstract link data 56 in some cases by building additional candidate links for the controller 52 to use (if required and if the use of such links would result in a lower-cost overall solution) based on user-defined or application-defined rules set in data files and configured in controller 52 for controlling transport network 54. In other words, controller 52 may build candidate links from candidate link definitions obtained by controller 52. For example, a user or application may define groups of packet-optical transport devices as types of nodes within transport network 54, e.g., access nodes, core nodes, and supercore nodes and may indicate the circumstances in which the packet-optical transport devices allow connections within a group or between groups. For instance, the rules may specify:

Access nodes can connect to the three nearest core nodes.
Core nodes can connect to the two nearest other core nodes.
Core nodes can connect to the two nearest supercore nodes.
Any supercore node can connect to any other.

The above rules are merely examples. The defined rules may also define the administrative weighting scheme usable by the software to transport the traffic if a candidate link is used to transport traffic. With regard to the above, the defined rules determine only candidate links and do not specify that such links must be used to transporting traffic. After applying techniques described herein to determine paths for a P2MP LSP, controller 22 may configure only a subset of the available links indicated in the candidate links for use in transporting traffic. In addition, controller 22 may be unable to add links to a given solution if such links are not in the collection generated in the candidate link sets. By contrast, path computation module 58 may use links already defined for network 6 even if such links are not in the candidate link set. In other words, path computation module 58 may unable to use links in determining a solution unless the links are defined either in the candidate link set or for network 6.

Controller 52 may route the existing or available "candidate links" in transport network 54 to determine their actual physical lengths and the shared-risks (SRLGs), for instance, in the link paths in the transport network 54. Paths for such links may be pre-computed prior to choosing the candidate links. Because the shortest path for a transport route may be excessively restrictive for purposes of failure resiliency, e.g., to protect against a failure of an SRLG from a transport link, controller 58 may determine multiple paths for a given candidate link from which path computation module 58 may choose. In some examples, the multiple paths for a given link may include the shortest path, the shorter of two diverse paths, and the longer of two diverse paths. While the shortest path and the shorter of two diverse paths may be identical, this need not necessarily be the case. Controller 58 may determine the diverse paths using a strong diverse path algorithm suitable for finding shortest diverse-cycle paths and taking account of SRLGs if available. In some cases, a logical link such as any of links 9 may already be configured in network 6 (i.e., "exist"), and the path for the logical link in transport layer 54 may be obtained by controller 58. In such cases, the known path can be fixed and the diverse paths describe above may not he determined or utilized by path computation module 58.

Because in some cases paths for links chosen from the candidate set or pre-computed prior to iteratively determining solutions for a P2MP LSP, path computation module 58 may avoid attempting to design the paths for the links in such a manner as to account for available wavelengths in the transport network 54 elements. This, in effect, allows path computation module 58 to assume the optical (e.g., WDM) capacity does not limit the determination of solutions for the P2MP LSP.

Upon selecting a path for a logical link, controller 2 may map the path to SRLG information for all links of network 6 carried by transport link section or node. Controller 22 may in some cases prune the set of candidate links based on the number of routers 4 the links "bypass" in the transport network, which may allow the candidate link set to be reduced on the basis of the transport link topology and the equipment rather than merely on the basis of length. This may further enable realistic modelling of core IP networks made up of high-speed routers having only direct lambda optical connections or a restricted set of connections that are limited to bypass only a small number of nodes. Thus, all IP-Layer links whose routes bypass these high-speed routers may be pruned from the candidate set of links.

Alternatively to controller 22 generating the abstract link data 56 and as noted above, path computation module 58 may obtain abstract link data 56 from an abstract link file or other data structure obtained from, e.g., a third-party network management system for transport network 54 or built by a user. Path computation module 58 may in this way obtain an abstract picture of the transport layer represented here by transport network 54 but remain unaware of the details of the transport network 54 topology. This alternative to obtaining abstract link data 56 may be advantageous, for the rules defining whether candidate links are or are not available depend upon the particularities of the various packet-optical transport devices employed in transport network 54. Obtaining candidate links directly as a set of "abstract links" from an abstract link file may enable more-complex constraints on the connections than are possible using relatively simple formulae for candidate link generation as described above.

Once the candidate links are obtained, iteratively determining solutions for a P2MP LSP according to the techniques using either just the existing links or the addition of a selected candidate links described herein is similar regardless of whether controller 22 obtains the abstract links from an abstract link file or generates them. A difference remains in that the controller 22 obtaining the candidate links from an external abstract link file involves only the network layer (network 6) of multi-layer network 60.

As noted above, abstract link data 56 may include link information for available links (additional candidate links and links 9 established in network 6) such as link lengths, link metrics, link costs, and a list of Shared Risk Link Groups (SRLGs) for links. In order to perform designs that take into account potential failure modes in the transport network of fiber-cuts, or WDM/optical component failures, as well as failures of devices and interfaces in the IP layer, the path computation module 58 may account for the transport layer equipment used by the IP links by applying penalties to links according SRLGs. Controller 52 may, for instance, obtain the SRLG information for transport layer elements corresponding to links 9 and/or candidate links identified in abstract link data 56. Such SRLG information could be for fiber sections, conduit (ducts) carrying the fibers, transport layer switching elements, and so forth. Controller 52 may obtain such SRLG information for existing links 9 to understand the failure modes of existing network 6. Controller 52 may obtain such SRLG information for existing link to understand the failure modes of the network 6 modified to include candidate links described in abstract link data 56 and selected by path computation module 58 during an iteration for determining solutions for a P2MP LSP according to techniques described herein.

With regard to the above, resiliency mechanisms need to rely on predicting which resources have a high likelihood to fail contemporaneously in order to correctly assign redundant routes. In a simple network, a node or a link between nodes may fail due to a local failure. However in a packet/optical network, a single fiber cut of a DWDM link would affect all wavelengths transported. Moreover, each individual wavelength may connect different pairs of routers such that a single fiber cut in the optical network appears to be a triple or quadruple failure in the network topology.

To cope with such situations, an SRLG or a set of SRLGs is assigned as a link attribute. An SRLG may be, for instance, represented by a 32-bit number unique within an IGP (OSPFv2 and IS-IS) domain, such as network 6 or an IGP within network 6 where network 6 encompasses multiple domains. A link 9 may be assigned multiple SRLGs. The SRLG of a path in a label-switched path (LSP) is the set of SRLGs for all the links in the path. Path computation module 58 may use SRLG information provided in abstract link data 56 when determining paths for P2MP LSPs. In general, when computing the secondary path for an LSP, it is preferable to find a path such that the primary and secondary paths, e.g. P2MP LSPs 32A, 32B of FIGS. 2A-2B, do not have any links in common in case the SRLGs for the primary and secondary paths are disjoint. This ensures that a single point of failure on a particular link does not bring down both the primary and secondary paths in the LSP. By comparing the SRLG attributes of links, a path computation module 58 can apply penalties during an iteration to facilitate disjoint SRLG attributes between the sets of links for the primary path and the secondary path and in this way arrive at diverse failure routes.

As a prerequisite, SRLGs of the optical domain represented by transport network 54 must be leaked into the packet domain represented by network 6 in order to avoid provisioning packet services on joint risk label-switched paths (LSPs). SRLGs may thus enable synchronizing routing decisions between layers of multi-layer network 60. Moreover, the nature of SRLG information is layer independent and can therefore be used as common reference information for routing at any layer.

Figure 4:
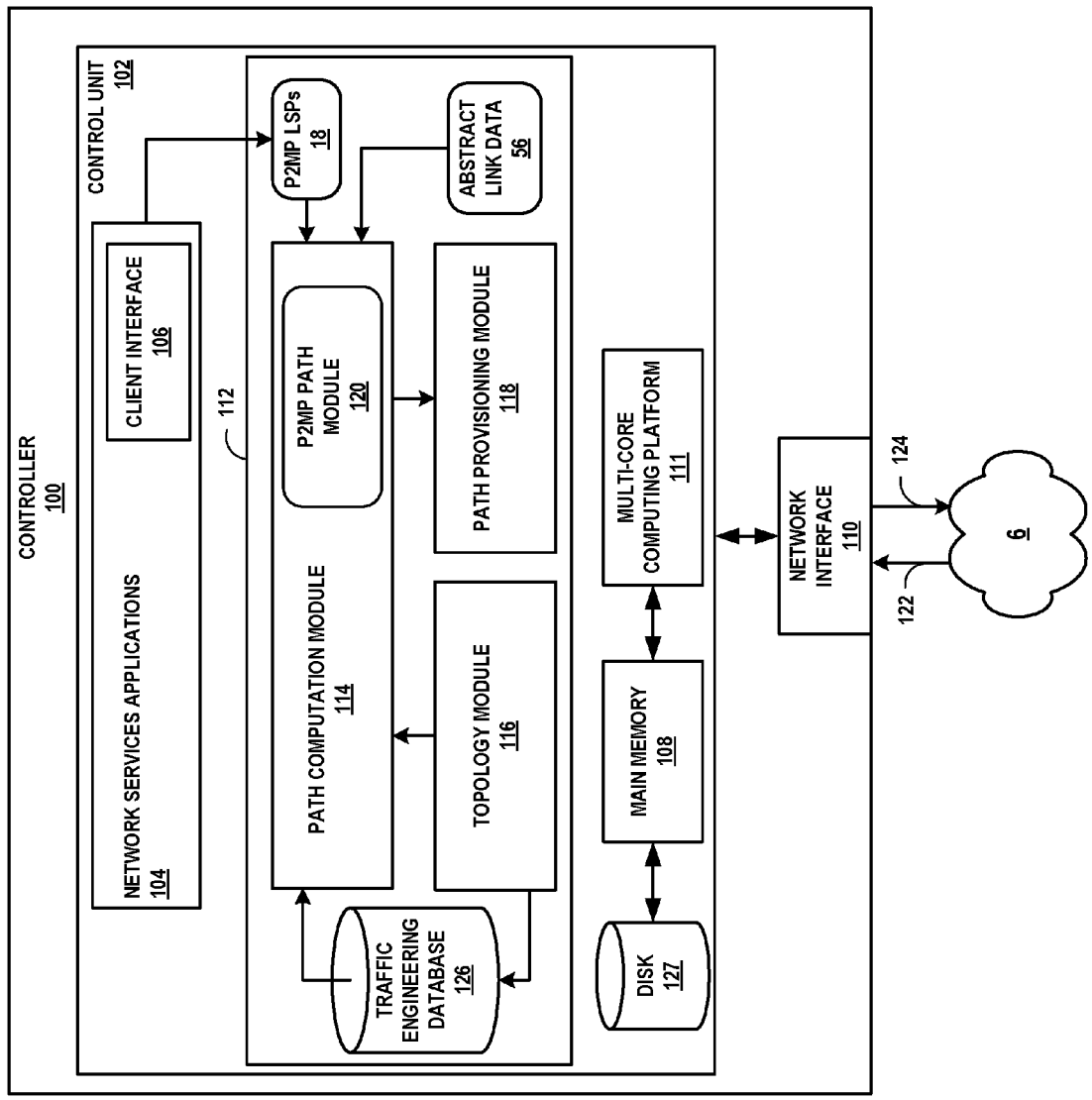
FIG. 4 is a block diagram illustrating an example controller configured to compute paths for point-to-multipoint label switched paths in accordance with techniques of this disclosure.

FIG. 4 is a block diagram illustrating an example controller configured to compute paths for point-to-multipoint label switched paths (LSPs) in accordance with techniques of this disclosure. Controller 100 receives path requests, computes and schedules paths that satisfy the path requests, and establishes requested paths in a path computation domain according to techniques described herein. Controller 100 may include a server or network controller, for example, and may represent an example instance of controller 10 of FIGS. 1-2 and controller 52 of FIG. 3.

Controller 100 includes a control unit 102 coupled to a network interface 110 to exchange packets with other network devices by one or more inbound links 122 and one or more outbound links 124. Main memory 108 of control unit 102 represents one or more computer-readable storage media, which may include random-access memory (RAM) such as various forms of dynamic RAM (DRAM), e.g., DDR2 SDRAM, or static RAM (SRAM), Flash memory, or any other form of fixed or removable storage medium that can be used to carry or store desired program code and program data in the form of instructions or data structures and that can be accessed by a computer. Main memory 108 provides a physical address space composed of addressable memory locations accessible by modules 112, 104.

Main memory 108 is coupled to disk 127, which may comprise computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store data and instructions.

Control unit 102 in this example includes multi-core computing platform 111 to execute modules 104, 112. Multi-core computing platform includes multiple processing cores that each includes an independent execution unit to perform instructions that conform to an instruction set architecture for the core. Cores of multi-core computing platform 111 may each be implemented as separate integrated circuits (ICs) or may be combined within one or more multi-core processors (or "many-core" processors) that are each implemented using a single IC (i.e., a chip multiprocessor).

Multi-core computing platform 111 executes software instructions, such as those used to define a software or computer program, stored to main memory 108. Alternatively or additionally, control unit 102 may comprise dedicated hardware, such as one or more integrated circuits, one or more Application Specific Integrated Circuits (ASICs), one or more Application Specific Special Processors (AS-SPs), one or more Field Programmable Gate Arrays (FP-GAs), or any combination of one or more of the foregoing examples of dedicated hardware, for performing the techniques described herein.

Control unit 102 provides an operating environment for network services applications 104 and path computation element 112. In some example, these modules may be implemented as one or more processes executing on one or more virtual machines of one or more servers. That is, while generally illustrated and described as executing on a single controller 100, aspects of modules 104, 112 may be executed on other computing devices or on different virtual machines of one or more computing devices.

Network services applications 104 represent one or more processes that provide services to clients of a service provider network that includes network 6 and controller 100 to manage connectivity in the path computation domain. Network services applications 104 may provide, for instance, include movie, television, or other media content distribution, Voice-over-IP (VoIP), Video-on-Demand (VOD), bulk transport, walled/open garden, IP Mobility Subsystem (IMS) and other mobility services, and Internet services to clients of a service provider network controlled at least in part by controller 100. Networks services applications 104 require services provided by path computation element 112, such as node management, session management, and policy enforcement. One or more of network services applications 104 may include or otherwise make use of a client interface 106 by which one or more client applications request services. Client interface 106 may represent a command line interface (CLI) or graphical user interface (GUI), for instance. Client 106 may also, or alternatively, provide an application programming interface (API) such as a web service to client applications.

Network services applications 104 may issue path requests to path computation element 112 to request paths in a path computation domain controlled by controller 100. For example, a path request may include a required bandwidth or other constraint and two endpoints representing a source and a destination that communicate over the path computation domain managed by controller 100. As another example, a path request may be a request for a P2MP path, in which case the path request may include a required bandwidth or other constraint and endpoints representing a source and multiple destinations that receive content send by the source over the path computation domain managed by controller 100. Control unit 102 stores P2MP path requests as respective P2MP LSP definitions in the P2MP LSPs 18 data structure. In some cases, the service provider or other administrator of network 6 may configure, via an administrative interface, one or more P2MP LSP definitions in P2MP LSPs 18.

Path computation element 112 accepts path requests from network services applications 104 to establish paths (as used herein and noted above, term "path" may refer to a P2MP path) between the endpoints over the path computation domain. Paths may be requested for different times and dates and with disparate bandwidth requirements. Path computation element 112 reconciles path requests from network services applications 104 to multiplex requested paths onto the network 6 path computation domain based on requested path parameters and network resource availability.

To intelligently compute and establish paths through the path computation domain, path computation element 112 includes topology module 116 to receive traffic engineering information, such as traffic engineering information 21 of FIG. 1, describing available resources of network 6, including routers 4 and interfaces thereof and interconnecting network links. Topology module 116 may execute one or more southbound protocols, such as Open Shortest Path First with Traffic Engineering extensions (OSPF-TE), Intermediate System to Intermediate System with Traffic Engineering extensions (ISIS-TE), BGP Link State (BGP-LS), to learn traffic engineering information for network 6.

Traffic engineering database (TED) 126 stores traffic engineering information, received by topology module 116, for network 6 that constitutes a path computation domain for controller 100. TED 126 may include one or more link-state databases (LSDBs), where link and node data is received in routing protocol advertisements, received from a topology server, and/or discovered by link-layer entities such as an overlay controller and then provided to topology module 116. In some instances, the service provider or other administrative entity may configure traffic engineering or other topology information within TED 126 via an administrative interface.

In accordance with techniques described in this disclosure and to satisfy path requests from network services applications and/or administratively-configured paths, path computation module 114 of path computation element 112 executes P2MP path module 120 to determine and optimize paths for P2MP LSPs 18. P2MP path module 120 applies techniques described in this disclosure to iteratively determine solutions for a P2MP path to globally-optimize a total cost that accounts for routing loops, the possibility of diversity, failure resilience, and/or the satisfaction of LSP constraints for a P2MP LSP of the P2MP LSPs 18.

Path computation module 114 having determined a path or diverse paths for a P2MP LSP of the P2MP LSPs 18, path provisioning module 118 attempts to set the paths onto the P2MP LSPs 18 (alternatively referred to as "flows") according to the network model defined by TED 126 and conforming to an up-to-date topology for the network 6 controlled by controller 100. Path provisioning module 118 of controller 100 programs the routes for routed LSPs of P2MP LSPs 18 into network 6 to cause the state of network 6 to match the state of network 6 as determined by path computation module 114. Path provisioning module 118 may represent an example of path provisioning module 26 of FIGS. 1-3. Provisioning a path may require path validation prior to committing the path to provide for packet transport. Path provisioning module 118 executes one or more southbound protocols for path provisioning to inject state into elements of network 6, such as any one or more of routers 4. A southbound protocol refers to a protocol by which components of controller 100 may communicate with network 6 elements, such as routers 4, to obtain or inject topology information, forwarding, and other network information that determines the operation of the network 4. For example, southbound protocols may include Path Computation Element (PCE) Communication Protocol (PCEP), Open Shortest Path First with Traffic Engineering extensions (OSPF-TE), intermediate System to Intermediate System with Traffic Engineering extensions (ISIS-TE), BGP Link State (BGP-LS), NETCONF/Yang, Interface to the Routing System (I2RS) protocols, CLIs for the network elements, Simple Network Management Protocol (SNMP), and OpenFlow (or other SDN configuration protocol). Path provisioning module 118 may provide one or more EROS for routed P2MP LSPs 18 to source routers for the routed LSPs, which may then signal the LSPs using RSVP-TE, as one example.

Topology module 116 may receive updated traffic engineering information from network 6, which may trigger dynamic re-computation by path computation module 114 of paths for P2MP LSPs 18. For example, TED 126 upon receiving a new or updated TE link or receiving information that a TE link has failed may trigger path computation module 114 to re-compute the paths, which may include respective diverse paths, for P2MP LSPs 18 in order to account for the TED 126 change.

Path computation module 114 may additionally/alternatively dynamically re-compute paths for P2MP LSPs 18 on receipt on new or updated abstract link data 56. For example, updated abstract link data 56 may indicate a new SRLG for a link, which may indicate previously-diverse paths for a P2MP LSP now have a common SRLG and are thus no longer diverse with respect to SRLG. P2MP path module 120 of path computation module 114 may, as a result, re-compute diverse paths for the P2MP LSP in order to again obtain diversity for the P2MP LSP.

Figure 5:
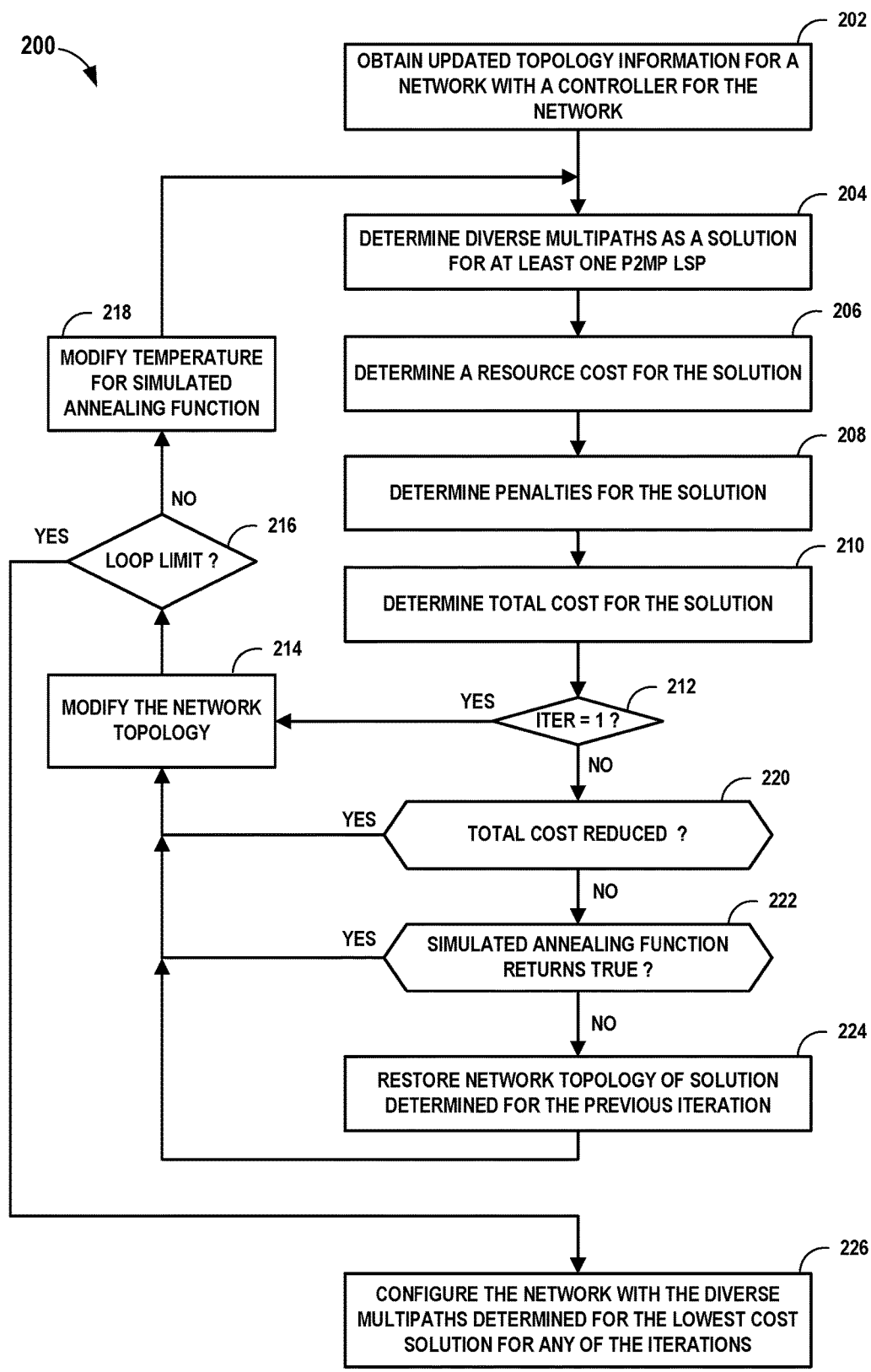
FIG. 5 is a flowchart illustrating an example mode of operation for one or more controllers to determine and optimize diverse paths for P2MP LSPs according to techniques described in this disclosure.

FIG. 5 is a flowchart illustrating an example mode of operation for one or more controllers to determine and optimize diverse paths for P2MP LSPs according to techniques described in this disclosure. Operation 200 is described with respect to controller 10 of FIGS. 1-2 but may be applied by controller 52 of FIG. 3 (and corresponding components thereof) or controller 100 of FIG. 4 (and corresponding components thereof), or by a decentralized control plane made up of multiple controllers or router control planes, for instance.

Controller 10 obtains live topology information for network 6 including routers 4 that in this example cooperatively implement an IP routing plane (202). Path computation module 24 responsively determines a solution including in some cases a set of diverse paths for each of one or more P2MP LSPs 18 configured in controller 10 (204). Path computation module 24 may use abstract link data 56, as described above with respect to FIGS. 3-4 and path computation modules 58, 114, to determine the solution. If there are two paths to optimize (e.g., for diverse multicast trees), path computation module 24 may use a blocking flag bit set for each path. In other words, an edge may be configured to allow one side of the paths in the diverse paths but block paths from the other side. In some cases, path computation module 24 determines a solution in response to receiving new or updated configurations for P2MP LSPs 18. Path computation module 24 determines a resource cost to the network 4 for the solution (206). To determine the resource costs for the purpose of optimization, path computation module 24 compute the total cost of the bandwidth capacity of links 9 of the network 4 used for the diverse paths. Path computation module 24 may compute the resource cost as the total bandwidth used by the solution as determined by the formula bandwidth×length. Alternatively, path computation module 24 may compute the resource cost as bandwidth×(total cost per bandwidth unit on the links in the tree). Path computation module 24 may alternatively use other resource cost functions that reflect the cost of the network resources used by the multicast tree. Because the bandwidth capacity is counted only once when routing multiple P2MP paths onto the same link on the trunk of the tree, operation 200 may facilitate efficient packet delivery by iteratively arriving at longer paths that reuse the bandwidth capacity more effectively.

Path computation module 24 additionally determines penalties applied to the solution (208). The penalties discourage undesirable features of paths, such as lack of diversity, routing loops, failure of the solution to meet the constraints configured for P2MP LSP 18. Example constraints configured for P2MP LSP may include a maximum number of next hops, a maximum number of overlaps in the path to satisfy diversity, and so forth. The magnitude of the penalty applied may be proportional to the magnitude of the failure, e.g., more next hops required over the maximum results in a larger penalty relative to the penalty applied for fewer next hops required over the maximum. As another example, path computation module 24 may apply a greater penalty for the more routing loops are present for a solution. Path computation module 24 accumulates the penalties applied to a solution and adds the accumulated total penalty cost to the resource cost to determine a total cost for the solution (210).

For the initial run (iteration) of the optimization algorithm (YES branch of 212), path computation module 24 does not perform a comparison with a previous solution but instead modifies the network topology (214). To modify the network topology of network 6, path computation module 24 may either (1) select one of the links 9 to block by adding a high (but not infinite) penalty to the routing metric on the link 9, or (2) select one of links 9 that had been previously blocked to 'unblock' by removing a penalty previously applied on the routing metric for the selected link 9. Path computation module 24 may choose between blocking or unblocking and select a link according to a random function. Path computation module 24 in some cases, however, may apply simple heuristics such as biasing more expensive links toward blocking and less expensive links toward unblocking, or by biasing more toward blocking links that have very low traffic on them [e.g., a very low ratio (traffic carried)/(link cost)] and towards unblocking, shorter links on busy nodes.

Having modified the network topology for purposes of the algorithm, path computation module 24 applies steps 204, 206, 208, and 210 to determine a new solution having new paths and to determine a total cost for the new solution. This is a subsequent iteration (NO branch of 212). Path computation module 24 compares the total cost for the new solution with the total cost for the previous solution (220), and if the total cost has been reduced with the new solution (YES branch of 220), path computation module 24 accepts the modified network topology and proceeds to step 214. If however the total cost has not been reduced with the new solution (NO branch of 220), path computation module 24 applies a simulated annealing function to determine whether to accept the modified network topology despite the modified network topology leading to a larger total cost (222). In this way, path computation module 24 may facilitate avoiding local minima of the total cost gradient to progress the solutions to a more globally-optimal solution. The simulated annealing function is a function that returns a positive result according to probability dependent on the magnitude of the cost increase and the iteration progress of the operation 200 (e.g., the number of iterations). As one example, the probability for the function may be defined as:

$$\exp(-\Delta C/T),$$

where $\Delta C$ is the magnitude of the cost increase vis-à-vis the previous solution and T is a "temperature" parameter that path computation module 24 generally but not exclusively reduces as the number of iterations increases. If the simulated annealing function returns a positive result (YES branch of 222), path computation module 24 proceeds to step 214. If the simulated annealing function returns true (NO branch of 222), which is typically more likely, path computation module 24 rejects the modified network topology and restores the network topology determined for the previous iteration (224). In this way, path computation module 24 may effectively jump out of a local minima.

At step 214, path computation module 24 modifies the network topology by blocking or unblocking one or more links as described above (214). If the number of iterations to be performed has not been reached (NO branch of 216), path computation module 24 modifies the temperature parameter for the simulated annealing function applied in step 222 (218). This reduction may be proportional to the number of iterations, based on configurable thresholds for the number of iterations, or some other scheme. Parameter T may be user-configurable or dependent on some aspect of the computation, such as the number of P2MP LSPs, a number of links, or other aspect. To facilitate a global optimum algorithm, path computation module 24 should spend as much time as possible in the temperature region where a reasonable percentage of the changes will increase the cost and then gradually reduce this percentage. As one example for determining T, at the start of the operation 200 path computation module 24 sets a target percentage to 10% such that 10% of network topology modifications result in a cost increase. At the end the target percentage is set to 0%. During the iteration the target percentage is reduced linearly as the iteration progresses. For instance, every N iterations, path computation module 24 will check the actual percentage of changes that increase the cost and check this against the target value. If the actual percentage is too high, then path computation module 24 will decrease the parameter T. If this actual percentage is too low then path computation module 24 will increase the parameter T. Example intermediate and final results of this process are depicted in FIGS. 6-8, below.

Once the iteration loop limit has been reached and the number of iterations to be performed are performed (YES of 216), path computation module 24 exits the operation. In some cases, the iteration complete check of step 216 is based on other acceptance criteria, such as iterating: a fixed elapsed time, until the P2MP LSP paths are diverse, until the total resource costs are less than some acceptable value, until there are no routing loops, some combination of the above, or until some other acceptance criteria is met. During the run of operation 200, path computation module 24 stores the solution for the lowest-cost solution identified during any of the iterations. While the lowest-cost solution identified during operation 200 may not be globally optimal, the solution may nevertheless be optimized versus the initial determination. Path provisioning module 26 configures the lowest-cost solution, including the diverse paths for P2MP LSPs 18, into network 6 (226).

Figure 6:
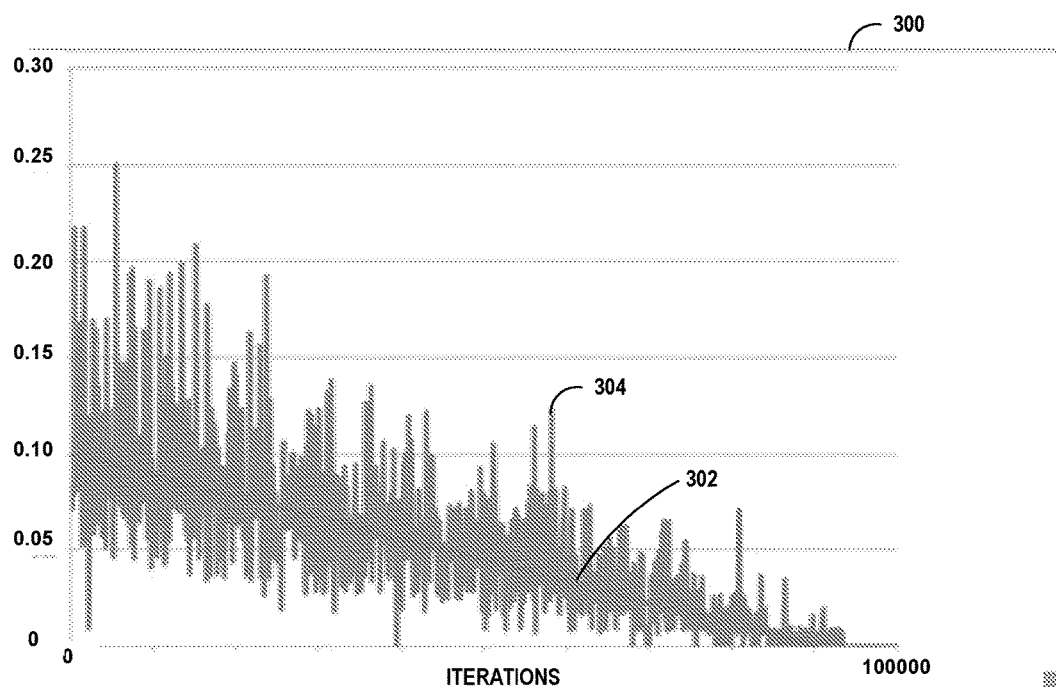
FIGS. 6-8 are charts illustrating intermediate and final parameters and results during an example run to determine and optimize diverse paths for P2MP LSPs in a network according to techniques described in this disclosure.
Figure 7:
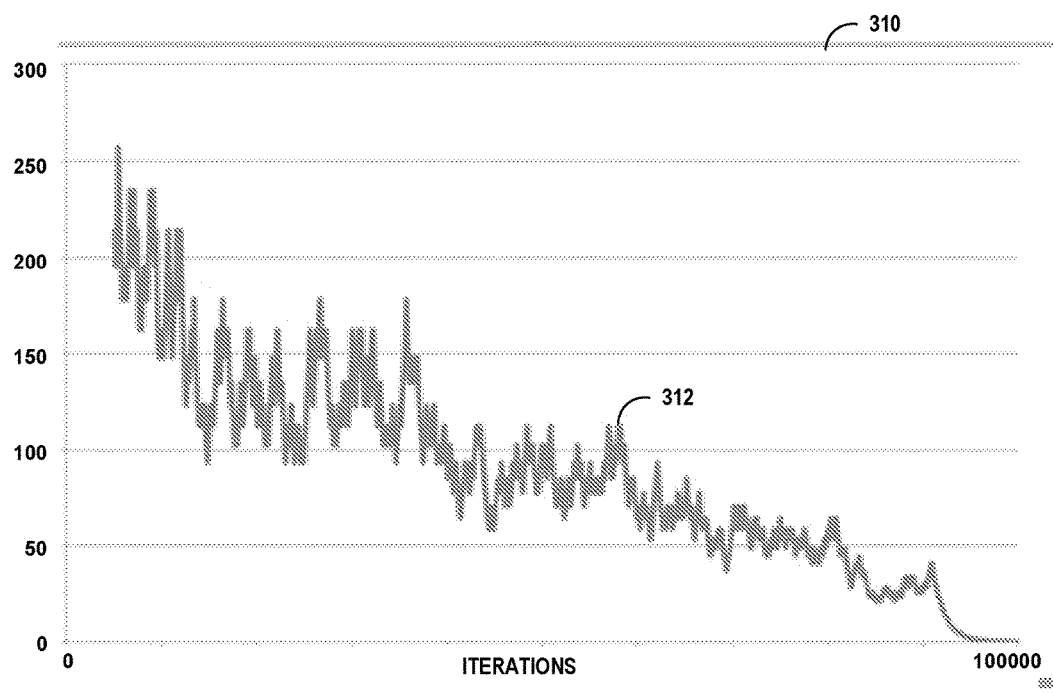
Figure 8:
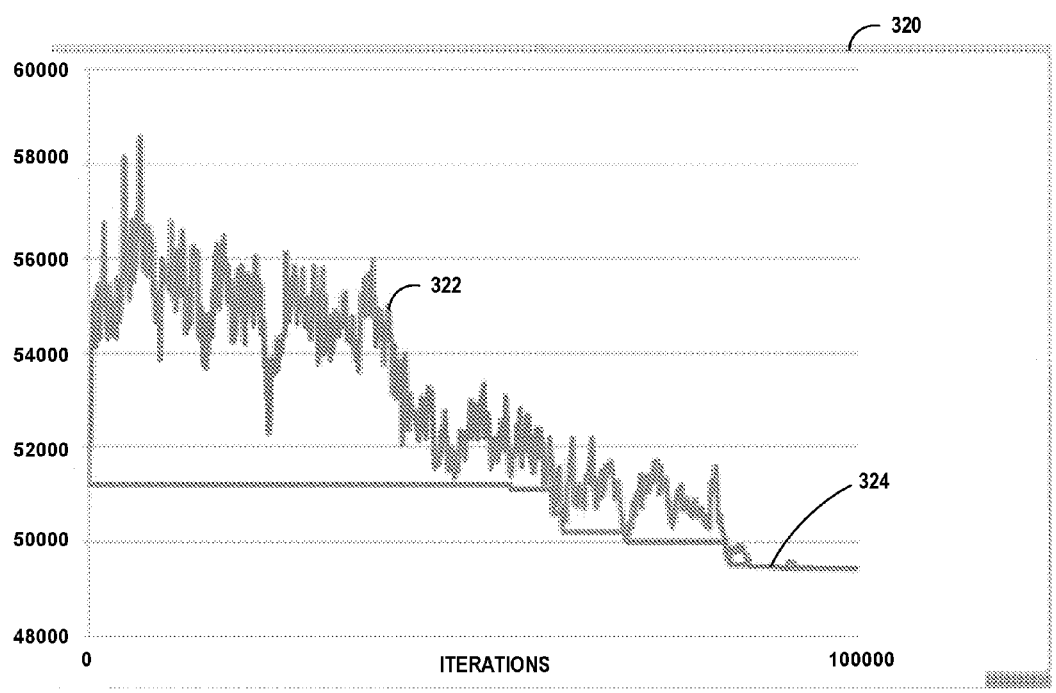

FIGS. 6-8 are charts illustrating intermediate and final parameters and results during an example run to determine and optimize diverse paths for P2MP LSPs in a network according to techniques described in this disclosure. The charts are merely illustrative. FIG. 6 depicts chart 300 showing a target ratio 302 set by path computation module 24 with the target probability that the value target ratio 302 for a given iteration will result in a cost increase. In this example, the initial target ratio for iteration 1 is set to 10%, and at the end the target percentage is set to 0%. During the iteration the target percentage is reduced linearly as the iteration progresses. For instance, every N iterations, path computation module 24 will check the actual percentage of changes (depicted in chart 300 as actual ratio 304) that increase the cost and check this against the target value. If the actual percentage is too high, then path computation module 24 will decrease the temperature parameter T for the simulated annealing function. If this actual percentage is too low then path computation module 24 will increase the parameter T.

FIG. 7 depicts chart 310 of the temperature parameter T for the simulated annealing function for an example run to determine and optimize diverse paths for P2MP LSPs in a network according to techniques described in this disclosure. Chart 310 illustrates an erratic yet downward trend as path computation module 24 adjusts the value of T to attempt meeting the target ratio 302 depicted in chart 300 of FIG. 6.

FIG. 8 depicts chart 320 illustrating intermediate and final total costs determined during an example run to determine and optimize diverse paths for P2MP LSPs in a network according to techniques described in this disclosure. Current total cost line 322 illustrates the total costs determined by path computation module 24 for iterations of the algorithm. Best total cost line 324 illustrates the total cost for the lowest cost solution obtained by path computation module 24 up to that point. Notably in this example, the initial iteration results in a best total cost that is not reached again until much further along in the run (after iteration ~55,000). The solution in fact drifted to a significantly higher cost at first. The large discrepancy between the current total cost and the best total costs illustrates the importance of storing the best solution yet identified during the course of a run.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable sage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
obtaining, by a controller of a network, configuration information for a point-to-multipoint label switched path (P2MP LSP);
obtaining, by the controller from the network via at least one protocol, network topology information defining a network topology for the network;
determining, by the controller based on the network topology, a first solution comprising at least one path through the network for the P2MP LSP;
computing, by the controller in response to determining the at least one path of the first solution has a failure to satisfy a constraint for the P2MP LSP, a penalty for the first solution that is based on a magnitude of the failure, wherein a total cost for the first solution includes the penalty for the first solution, and wherein the constraint comprises one of a maximum number of next hops or a maximum number of overlaps;
determining, by the controller after generating a modified network topology based on the network topology, a second solution comprising at least one path through the network for the P2MP LSP; and
outputting, by the controller for configuring the network, topology data for the solution of the first solution and the second solution having a lowest total cost, the lowest total cost of the solution including a total resource cost to the network for the solution.

2. The method of claim 1, wherein the magnitude of the failure corresponds to a difference between the maximum number of next hops and a number of next hops of a path of the at least one path, of the first solution, through the network for the P2MP LSP.

3. The method of claim 1, wherein the magnitude of the failure corresponds to a difference between the maximum number of overlaps and a number of overlaps between a first path of the at least one path, of the first solution, through the network for the P2MP LSP and a second path of the at least one path, of the first solution, through the network for the P2MP LSP.

4. The method of claim 1, wherein the magnitude of the failure further corresponds to a number of routing loops of the at least one path, of the first solution, through the network for the P2MP LSP.

5. The method of claim 1, further comprising:
obtaining, by the controller from the network via the at least one protocol, updated network topology information defining an updated network topology for the network;
determining, by the controller based on the updated network topology and in response to obtaining the updated network topology information, a new first solution comprising a new at least one path through the network for the P2MP LSP;
determining, by the controller after generating an updated modified network topology based at least on the updated network topology, a new second solution comprising a new at least one path through the network for the P2MP LSP; and
outputting, by the controller for configuring the network, topology data for the solution of the new first solution and the new second solution having the lowest total cost.

6. A method comprising:
obtaining, by a controller of a network, configuration information for a point-to-multipoint label switched path (P2MP LSP);
obtaining, by the controller from the network via at least one protocol, network topology information defining a network topology for the network;
determining, by the controller based on the network topology, a first solution comprising at least one path through the network for the P2MP LSP;
computing, by the controller in response to determining the at least one path of the first solution has a failure to satisfy a constraint for the P2MP LSP, a penalty for the first solution that is based on a magnitude of the failure, wherein a total cost for the first solution includes the penalty for the first solution;
determining, by the controller after generating a modified network topology based on the network topology, a second solution comprising at least one path through the network for the P2MP LSP,
wherein generating a modified network topology comprises one of blocking, by the controller, a link of a plurality of links in the network topology by applying a link penalty to a metric for the link and unblocking, by the controller, the link by removing the link penalty to the metric for the link, and
wherein determining the second solution comprising at least one path through the network for the P2MP LSP comprises determining the second solution based at least in part on blocking or unblocking the link; and
outputting, by the controller for configuring the network, topology data for the solution of the first solution and the second solution having a lowest total cost, the lowest total cost of the solution including a total resource cost to the network for the solution.

7. The method of claim 1, further comprising:
determining, by the controller, a magnitude of a total cost increase for the second solution from the first solution; and
determining, by the controller, a result of a simulated annealing function based on the magnitude of the total cost increase and a temperature parameter.

8. The method of claim 1,
iteratively determining, by the controller for a number of iterations, additional solutions comprising paths through the network for the P2MP LSP,
wherein outputting topology data for the solution of the first solution and the second solution having the lowest total cost comprises outputting, by the controller for configuring the network, topology data for the solution of the first solution, the second solution, and the additional solutions having the lowest total cost.

9. A controller for a network, the controller comprising one or more processors coupled to a memory, configured to:
obtain configuration information for a point-to-multipoint label switched path (P2MP LSP);
obtain, from the network via at least one protocol, network topology information defining a network topology for the network;
determine, based on the network topology, a first solution comprising at least one path through the network for the P2MP LSP;
compute, in response to a determination the at least one path of the first solution has a failure to satisfy a constraint for the P2MP LSP, a penalty for the first solution that is based on a magnitude of the failure, wherein a total cost for the first solution includes the penalty for the first solution, and wherein the constraint comprises one of a maximum number of next hops or a maximum number of overlaps;
determine, after generation of a modified network topology based on the network topology, a second solution comprising at least one path through the network for the P2MP LSP; and
output, for configuring the network, topology data for the solution of the first solution and the second solution having a lowest total cost, the lowest total cost of the solution including a total resource cost to the network for the solution.

10. The controller of claim 9, wherein the magnitude of the failure corresponds to a difference between the maximum number of next hops and a number of next hops of a path of the at least one path, of the first solution, through the network for the P2MP LSP.

11. The controller of claim 9, the magnitude of the failure corresponds to a difference between the maximum number of overlaps and a number of overlaps between a first path of the at least one path, of the first solution, through the network for the P2MP LSP and a second path of the at least one path, of the first solution, through the network for the P2MP LSP.

12. The controller of claim 9, wherein the magnitude of the failure further corresponds to a number of routing loops of the at least one path, of the first solution, through the network for the P2MP LSP.

13. The controller of claim 9, further configured to:
obtain, from the network via the at least one protocol, updated network topology information defining an updated network topology for the network;
determine, based on the updated network topology and in response to obtainment of the updated network topology information, a new first solution comprising a new at least one path through the network for the P2MP LSP;
determine, after generation of an updated modified network topology based at least on the updated network topology, a new second solution comprising a new at least one path through the network for the P2MP LSP; and
output, for configuring the network, topology data for the solution of the new first solution and the new second solution having the lowest total cost.

14. A controller for a network, the controller comprising one or more processors coupled to a memory, the controller configured to:
obtain configuration information for a point-to-multipoint label switched path (P2MP LSP);
obtain, from the network via at least one protocol, network topology information defining a network topology for the network;
determine, based on the network topology, a first solution comprising at least one path through the network for the P2MP LSP;
compute, in response to a determination the at least one path of the first solution has a failure to satisfy a constraint for the P2MP LSP, a penalty for the first solution that is based on a magnitude of the failure, wherein a total cost for the first solution includes the penalty for the first solution;
determine, after generation of a modified network topology based on the network topology, a second solution comprising at least one path through the network for the P2MP LSP, wherein generation of the modified network topology comprises one of blocking a link of a plurality of links in the network topology by applying a link penalty to a metric for the link and unblocking the link by removing the link penalty to the metric for the link, and
wherein determination of the second solution comprising at least one path through the network for the P2MP LSP comprises determination of the second solution based at least in part on blocking or unblocking the link; and
output, for configuring the network, topology data for the solution of the first solution and the second solution having a lowest total cost, the lowest total cost of the solution including a total resource cost to the network for the solution.

15. The controller of claim 9, further configured to:
determine a magnitude of a total cost increase for the second solution from the first solution; and
determine a result of a simulated annealing function based on the magnitude of the total cost increase and a temperature parameter.

16. A non-transitory computer-readable medium comprising instructions that, when executed by one or more programmable processors of a controller of a network, cause the one or more programmable processors of the controller to:
obtain configuration information for a point-to-multipoint label switched path (P2MP LSP);
obtain, from the network via at least one protocol, network topology information defining a network topology for the network;
determine, based on the network topology, a first solution comprising at least one path through the network for the P2MP LSP;
compute, in response to a determination the at least one path of the first solution has a failure to satisfy a constraint for the P2MP LSP, a penalty for the first solution that is based on a magnitude of the failure, wherein a total cost for the first solution includes the penalty for the first solution, and wherein the constraint comprises one of a maximum number of next hops or a maximum number of overlaps;
determine, after generation of a modified network topology based on the network topology, a second solution comprising at least one path through the network for the P2MP LSP; and
output, for configuring the network, topology data for the solution of the first solution and the second solution having a lowest total cost, the lowest total cost of the solution including a total resource cost to the network for the solution.

* * * * *